Figure 1:
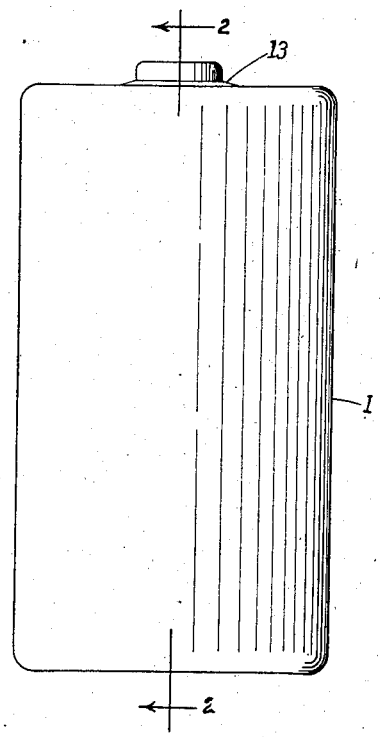

Nov. 18, 1941.　　　C. P. DEIBEL　　　2,262,837

DRY CELL BATTERY UNIT

Filed June 22, 1940

INVENTOR.
CYRIL P. DEIBEL
BY Hull, West + Chilton
ATTORNEYS.

Patented Nov. 18, 1941

2,262,837

UNITED STATES PATENT OFFICE 2,262,837

DRY CELL BATTERY UNIT

Cyril P. Deibel, Lakewood, Ohio

Application June 22, 1940, Serial No. 341,912

6 Claims. (Cl. 136—107)

This invention relates to a dry cell or dry cell battery unit which is particularly well adapted for use in flashlights or for other purposes where a leak-proof cell or battery unit is required.

One of the objects of the invention is to provide a dry cell battery unit which consists of one or more cells enclosed within a single outer casing and sealed therein in such manner that any leakage which may occur as the result of excessive pressure or gassing will be retained within the outer casing and will not be allowed to escape.

Another object of the invention is to provide a dry cell unit which is made up of one or more dry cells arranged within an outer metal casing and insulated therefrom, each cell comprising a metal container containing a mass of mix, a carbon electrode and an electrolyte; each end of the outer casing being thoroughly sealed and closed so as to prevent leakage of liquid.

Another object of the invention is to provide a dry cell battery unit which comprises an outer metal casing which is preferably in the form of a metal shell and in which is arranged a dry cell proper which is insulated from the outer casing and which contains a mass of mix, a carbon electrode, and an electrolyte; the upper end of the carbon electrode projecting a slight distance above the plane of the upper end of the outer casing; and the cell being insulated from the outer casing by means of a distensible sleeve or casing which is preferably made of thin rubber and which extends entirely over the upper end of the carbon electrode and is secured to the lower end of the cell in liquid-tight relation, there being a metal cover which closes the upper end of both the cell and the outer casing and which is insulated therefrom; the battery unit having means providing an electrical connection between the carbon electrode and the metal cover, the lower end of the cell having a portion disposed substantially flush with the lower edge of the outer casing and serving as one terminal or electrode, the outer casing having its opposite end spun over inwardly and serving to hold the dry cell within the outer casing in liquid-tight relation and under considerable pressure.

Another object of the invention is to provide a dry cell battery unit which consists essentially of an outer metal casing open at both ends and in which fits a dry cell which is insulated therefrom and comprises essentially a zinc cup or container containing a mass of mix, a carbon electrode and an electrolyte, and a distensible sealing member formed rubber or the like enclosing the zinc container and extending over the carbon electrode and secured to the outer metal casing and insulating it therefrom, the upper and lower ends of the outer casing being bent over inwardly and holding the dry cell proper within the outer casing in liquid-tight relation.

Another object of the invention is to provide a dry cell battery unit having the above described distinguishing features and characteristics and which is well adapted for quantity production at comparatively low cost.

Figure 2:
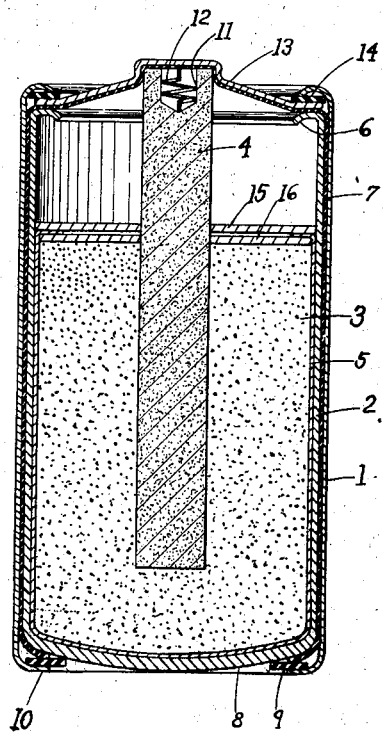
Figure 3:
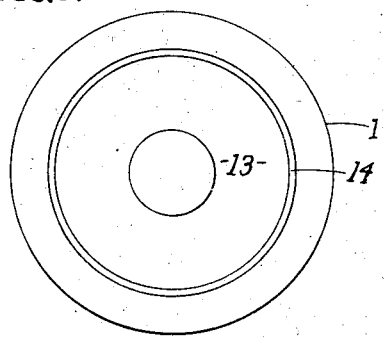
Figure 4:
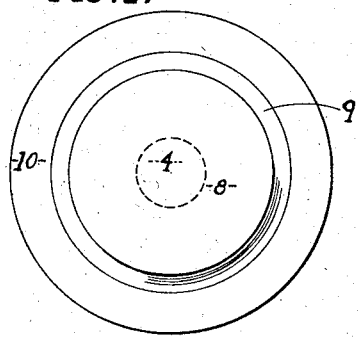

Further and more limited objects of the invention will appear as the description proceeds and by reference to the accompanying drawing in which Fig. 1 is a view in side elevation showing my improved dry cell battery unit; Fig. 2 is a vertical sectional view on the line 2—2 of Fig. 1; Fig. 3 is a top plan view of the cell shown in Fig. 1, and Fig. 4 is a bottom plan view of such cell.

Referring now to the drawing, the reference character I designates a metal shell or casing which is open at both ends and in which is disposed a dry cell which preferably consists of an extruded zinc container 2 which is preferably, though not necessarily, circular in shape and which has a bottom wall of substantially greater thickness than the side walls and which contains a mass of mix 3 and a carbon electrode 4. The mass of mix is preferably enclosed by a paper liner 5 and the upper end of the container is preferably bent over inwardly as indicated at 6. Enclosing the zinc container 2 and extending over the top of the carbon electrode 4 is a sleeve 7 preferably formed of thin distensible insulating material such as rubber. This rubber sleeve snugly fits the zinc container and is secured thereto adjacent the lower end of the zinc container in a manner to be hereinafter described. The bottom wall 8 of the zinc container is slightly convex and is considerably thicker than the side walls thereof so as to provide additional metal at the bottom of the cell. The zinc container is preferably extruded from a zinc slug. Surrounding the bottom wall 8 is a washer 9 which is preferably formed of fiber or some other suitable insulating material. The lower end of the outer casing I is spun over inwardly, as shown at 10, and the lower edge of the rubber sleeve 7 is disposed in the space between the washer 9 and the turned-over portion 10. The upper end of the carbon electrode is recessed as indicated at 11 and fitting therein is a spring 12 the upper end of which projects through an opening provided in the sleeve 7. Also fitting over the upper end of the carbon electrode is a metal cover member 13 which closes the upper end of the zinc container 2 and rests upon the rubber sleeve 7.

Disposed over the upper edge of the metal cover 13 is a fiber disk or washer 14, and the upper end of the outer casing 1 is spun over inwardly and serves to hold the metal cover in place and to provide a liquid-tight joint. It will be noted that the metal cover member 13 closes both the inner zinc container 2 and the outer metal casing 1. The spring 12 serves to provide an electrical connection between the carbon electrode and the metal cover 13 which is insulated from both the zinc container and the outer casing. It will therefore be seen that the metal cover 13 constitutes one terminal or electrode for the cell and that the bottom end 8 of the zinc container constitutes the other terminal or electrode, while the cell itself is completely insulated from the outer casing. Surrounding the carbon electrode and closely fitting the side walls of the zinc container are a pair of insulating washers 15 and 16 which serve to hold the mass of mix in place.

In assembling the unit, the fiber washer 9 is first inserted into the open end of the outer casing which at that time has its lower end spun over inwardly and its upper end open. The coil spring 12 is next inserted in the recess 11 in the position shown in Fig. 2. The distensible rubber sleeve or jacket 7 is then placed over the cell with the lower end disposed as shown in Fig. 2 and with the upper end of the spring 12 projecting through a small opening provided in the rubber sleeve. The cell is next inserted into the casing to the position shown in Fig. 2. The metal cover 11 is then placed over the carbon electrode in the position shown in Fig. 2 and the fiber washer 14 is next inserted. The outer casing is then placed within a suitable fixture and considerable pressure exerted on the upper end of the metal cover and, with the parts held in this position, the upper end of the outer casing is spun over inwardly until it bears against the fiber washer, thus providing a liquid-tight joint. It will be noted that the mass of mix does not completely fill the cell but that there is sufficient space left at the top thereof to provide a gas chamber.

It will also be noted that the rubber sleeve 7 and metal cover member 13 completely close the upper end of the battery unit and prevent any leakage of liquid as a result of chemical action or excessive pressure generated within the cell. The rubber sleeve performs the dual function of insulating the cell from the outer casing and of providing a liquid-tight closure for both ends of the cell.

The improved construction herein described and claimed provides a dry cell battery unit which has exceptionally long shelf life as well as active life, and in which the possibility of leakage of the liquid contents of the cell is reduced to a minimum.

It is of course to be understood that various changes may be made in the materials used as well as in the details of construction and arrangement of parts without departing from the spirit of my invention; and that the embodiment of my invention herein disclosed is to be considered merely as illustrative and not in a limiting sense. For heavy duty service, it is of course contemplated that the outer container may contain two or more dry cells. The invention, therefore, is limited only in accordance with the scope of the appended claims.

Having thus described my invention, what I claim is:

1. A dry cell unit comprising an outer metal casing, a dry cell sealed within said casing in liquid-tight relation and including a zinc container containing a carbon electrode and a mass of mix, the upper end of the carbon electrode projecting beyond the end of said casing, a distensible sealing member extending over said carbon electrode and zinc container and snugly fitting the same and secured adjacent the bottom thereof in liquid-tight relation and serving to insulate said metal casing from said zinc container, the upper and lower ends of said outer casing being turned over inwardly and holding said cell within said casing in liquid-tight relation, a metallic closure member extending over said carbon electrode and the top of said sealing member and closing said zinc container and said outer casing and insulated therefrom, and means electrically connecting said metal cover member and carbon electrode.

2. A dry cell battery unit comprising a metal casing open at both ends, a dry cell arranged within said casing, comprising a metal container containing a carbon electrode and a mass of mix, a sealing member extending over the top of said carbon electrode and closing said metal container, said sealing member being formed of a material having the quality of permitting excessive gas pressure within the cell to be relieved therethrough while preventing the liquid contents of the cell from escaping, said sealing member being secured adjacent the bottom of said metal container in liquid-tight relation, a metal cover member also extending over said carbon electrode and sealing member and closing said metal container and insulated therefrom, the upper and lower ends of said outer casing being turned over inwardly and holding said cell within said casing in liquid tight relation, and means electrically connecting said metal cover and carbon electrode.

3. A dry cell battery unit comprising a metal casing open at both ends, a dry cell arranged within said casing, comprising a metal container containing a carbon electrode and a mass of mix, a sealing and insulating member extending over the top of said carbon electrode and metal container and secured adjacent the bottom of said metal container in liquid-tight relation, a metal cover member extending over said carbon electrode and sealing member and closing said metal outer casing and insulated therefrom, the upper and lower ends of said outer casing being turned over inwardly and holding said cell within said casing in liquid-tight relation, and means electrically connecting said metal cover and carbon electrode, the upper end of said metal cover member being disposed in a plane above the upper edge of said outer casing, and the lower end of said metal container being disposed in substantially the same plane as the inwardly turned lower end of said casing.

4. A dry cell battery unit comprising an outer metal casing open at both ends, a dry cell fitting within said casing and insulated therefrom and comprising a metal container in which is disposed a mass of mix and a carbon electrode, a distensible sealing and insulating member enclosing said metal container and extending over said carbon electrode and secured to said metal container and insulating said metal container from said outer casing, a metal cover member closing the upper end of said metal container and outer casing, the upper and lower ends of said outer casing being bent over inwardly and holding said cell within said outer casing in liquid-tight relation.

5. A dry cell comprising an outer metal casing, a dry cell arranged within said casing and comprising a zinc container containing a mass of mix and a carbon electrode, the upper end of said carbon electrode projecting above the plane of the upper end of said outer casing, a sealing member extending over said carbon electrode and zinc container and snugly fitting the zinc container and secured adjacent the bottom thereof and serving to insulate the zinc container from said outer casing, a metal cover member extending over the top of said carbon electrode and closing both said zinc container and outer casing and insulated therefrom, said outer casing having the opposite ends thereof deflected inwardly and securing said sealing member, cover member and outer casing in liquid tight relation, one end of said zinc container being exposed and providing an electrode for said cell and means connecting said metal cover member with said carbon electrode, said sealing member being formed of a material having the quality of permitting excessive gas pressure within the cell to be relieved therethrough while preventing the liquid contents of the cell from escaping.

6. A dry cell battery comprising an outer metal casing, a dry cell arranged within said casing and including a metal container containing a mass of mix and a carbon electrode, a distensible sealing and insulating member extending over the top of said carbon electrode and closing said metal container and insulating it from said casing, one end of said metal container being exposed and providing an electrode for said cell, a metal cover extending over the top of said carbon electrode and the top of said sealing member and closing both said metal container and said outer casing, and means electrically connecting said metal cover and carbon electrode.

CYRIL P. DEIBEL.